US010460632B2

(12) United States Patent
Jones et al.

(10) Patent No.: US 10,460,632 B2
(45) Date of Patent: Oct. 29, 2019

(54) SYSTEMS AND METHODS FOR AUTOMATIC PHYSICAL OBJECT STATUS MARKING

(71) Applicant: Walmart Apollo, LLC, Bentonville, AR (US)

(72) Inventors: Matthew Allen Jones, Bentonville, AR (US); Nicholaus Adam Jones, Fayetteville, AR (US); Steven Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/001,288

(22) Filed: Jun. 6, 2018

(65) Prior Publication Data
US 2018/0357937 A1 Dec. 13, 2018

Related U.S. Application Data

(60) Provisional application No. 62/517,274, filed on Jun. 9, 2017.

(51) Int. Cl.
*G08B 13/24* (2006.01)
*G06K 7/10* (2006.01)
(Continued)

(52) U.S. Cl.
CPC .............. *G09F 3/208* (2013.01); *A45C 13/18* (2013.01); *G06K 19/06028* (2013.01);
(Continued)

(58) Field of Classification Search
CPC .............. G06K 19/06112; G06K 17/00; G06K 19/07703; G06K 17/0022;
(Continued)

(56) References Cited

U.S. PATENT DOCUMENTS 5,151,684 A 9/1992 Johnsen
8,159,463 B2 4/2012 Weiner
(Continued)

FOREIGN PATENT DOCUMENTS

WO 2013186330 A1 12/2013

OTHER PUBLICATIONS

International Search Report and Written Opinion from related International Patent Application No. PCT/US2018/036232 dated Aug. 24, 2018.
(Continued)

*Primary Examiner* — Dionne Pendleton
(74) *Attorney, Agent, or Firm* — McCarter & English, LLP; David R. Burns

(57) ABSTRACT

Described in detail herein are systems and methods for an automatic physical object status marking system. An electronic label can display a machine-readable element encoded with an identifier associated with a physical object on the display. A first computing system can receive instructions to modify a status of the physical object. The first computing system can retrieve the identifier associated with the physical objects and the identifier associated with the electronic label. The first computing system can control display of the electronic label to display a visual indicator associated with the status. An RFID reader can detect a RFID tag of the electronic label. The RFID reader can transmit the identifier associated with the electronic label to the second computing system. The second computing system is prevented from scanning a machine-readable element associated with the physical object in response to receiving the first identifier from the RFID reader.

18 Claims, 8 Drawing Sheets

(51) Int. Cl.
*G07C 9/00* (2006.01)
*G09F 3/20* (2006.01)
*H04W 4/35* (2018.01)
*G06K 19/06* (2006.01)
*A45C 13/18* (2006.01)
*G06K 19/07* (2006.01)
*G06K 19/077* (2006.01)
*G06Q 30/06* (2012.01)

(52) U.S. Cl.
CPC .... *G06K 19/06112* (2013.01); *G06K 19/0723* (2013.01); *G06K 19/07707* (2013.01); *G08B 13/2402* (2013.01); *G08B 13/2417* (2013.01); *G08B 13/2428* (2013.01); *G08B 13/2434* (2013.01); *G08B 13/2445* (2013.01); *G08B 13/2462* (2013.01); *H04W 4/35* (2018.02); *G06Q 30/06* (2013.01)

(58) Field of Classification Search
CPC .......... G06K 19/07749; G06K 19/027; G06K 19/04; G06K 19/06; G06K 19/07; G06K 19/0705; G06K 19/0717; G06K 19/0724; G06K 19/077; G06K 19/07707; G06K 19/07758; G06K 2017/0045; G06K 2017/0048; G06K 2017/0051; G06K 2017/0093; G06K 2017/0096; G06K 7/10079; G09F 3/208; G09F 21/02; G09F 3/02; G09F 9/372; H04W 4/35; G06Q 10/087; G06Q 10/08; G06Q 20/203; G06Q 30/06; G06Q 50/02; G06Q 50/30; G08B 13/2417; G08B 13/2434; G08B 13/242; G08B 13/2431; G08B 13/246; G08B 13/2462; G08B 13/2474; A01K 11/004; A01K 11/008; A01K 15/021; C09K 19/00; G01G 19/413; G01G 19/414; G01G 19/4144; G01G 19/42; G01G 7/06; G06F 3/1454; G06F 3/147; G01S 5/04; G09G 2380/02; G09G 2380/04; G09G 3/344; G09G 2300/023; G09G 2370/16; Y04S 10/56; Y10T 436/13

See application file for complete search history.

(56) References Cited

U.S. PATENT DOCUMENTS

| | | |
|---|---|---|
| 9,275,361 B2 | 3/2016 | Meyer |
| 2004/0099736 A1 | 5/2004 | Neumark |
| 2004/0201454 A1* | 10/2004 | Waterhouse ......... A01K 11/004 340/10.1 |
| 2005/0104035 A1 | 5/2005 | Eaddy et al. |
| 2006/0169787 A1 | 8/2006 | Gelbman |
| 2008/0303637 A1 | 12/2008 | Gelbman et al. |
| 2014/0002239 A1* | 1/2014 | Rayner ............... G08B 13/1427 340/5.61 |
| 2015/0035674 A1* | 2/2015 | Karhuketo .......... G06K 19/027 340/572.8 |
| 2015/0084745 A1* | 3/2015 | Hertz ...................... H04W 4/02 340/10.3 |
| 2017/0287297 A1* | 10/2017 | Hardie-Bick ........ G08B 13/242 |

OTHER PUBLICATIONS

E ink HTC and Palladio Collaborate to Develop Smart Packaging Label for IOT-Based Healthcare Services, E ink Press Release, http://www.eink.com/press_releases/e_ink_palladio_smart_packaging_label_10042016.html, Oct. 4, 2016.

* cited by examiner

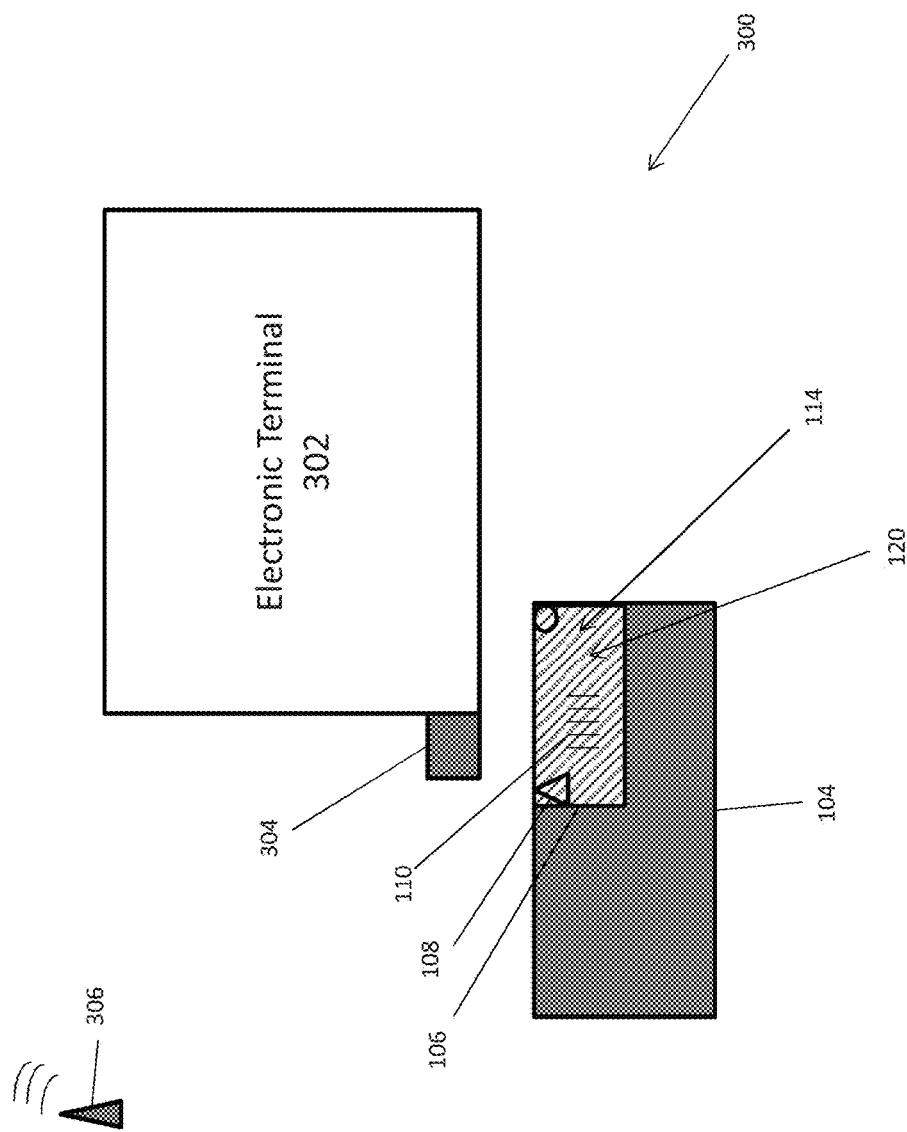

SYSTEMS AND METHODS FOR AUTOMATIC PHYSICAL OBJECT STATUS MARKING

CROSS-REFERENCE TO RELATED PATENT APPLICATION

This application claims priority to U.S. Provisional Application No. 62/517,274 filed on Jun. 9, 2017, the content of which is hereby incorporated by reference in its entirety.

BACKGROUND

A facility may receive reservation requests for physical objects. There can be a discrepancy between available physical objects and the reserved physical objects.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the invention and, together with the description, help to explain the invention. In the figures:

FIG. 3 illustrates a computing system disposed in a facility according to an exemplary embodiment;

DETAILED DESCRIPTION

Figure 1:
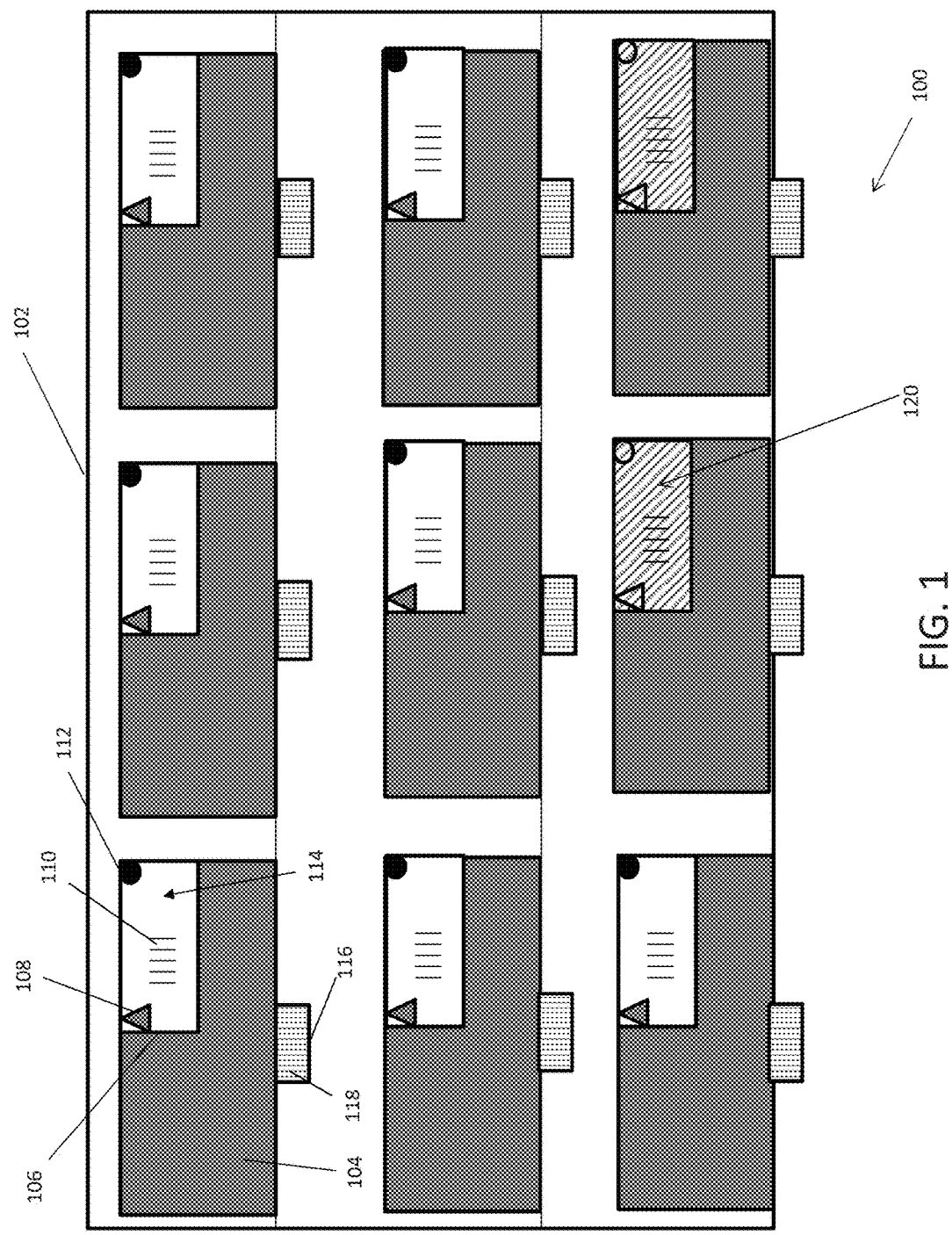
FIG. 1 is a schematic diagram of exemplary physical objects disposed on a shelving unit with an electronic label according to an exemplary embodiment.

Described in detail herein are systems and methods for automatic physical object status marking. Electronic labels can be affixed to corresponding physical objects disposed in a facility. For example, one of the electronic labels can be affixed to a corresponding one of the physical objects. A display of each electronic label can render information associated with the physical objects to which they are affixed. As one example, the information can include alphanumeric strings, one or more graphics, icons, or indicators, and/or a machine-readable element encoded with an identifier associated with the physical object to which the electronic label is affixed.

In addition to a display, each electronic label can include a RFID tag encoded with an identifier associated with the electronic label. The identifier encoded in the RFID tag can be associated with the physical object on which the electronic label is affixed. A first computing system can receive instructions to modify a status of a physical object. In response, the first computing system can query a database to retrieve the identifier associated with the physical object and the identifier associated with the electronic label affixed to the physical object. The first computing system can control the display of the electronic label to render a visual indicator to indicate the status of the physical object.

An RFID reader can detect the RFID tag of the electronic label affixed to the physical object in response to the RFID tag being within range of the RFID reader. The RFID reader can be disposed with respect to a second computing system. The second computing system can include an optical scanner. The RFID reader can transmit the identifier of the RFID tag associated with the electronic label to the second computing system, and the second computing system can be prevented from scanning or processing a machine-readable element associated with the physical object in response to receiving the identifier read by the RFID reader.

An image capturing device can be incorporated into the electronic label to capture an image of attributes associated with a physical object and the electronic label can transmit the captured image and/or attributes to the first computing system. The first computing system can determine the identifier associated with the physical object based on the attributes or captured image, can generate a machine-readable element encoded with the identifier, and can control the display of the electronic label to render the machine-readable element.

The first computing system can receive instructions to modify a status of the first one of the physical objects from one or more remote computing systems. The display of the at least one electronic label can be an e-ink display or a LED/LCD display. The electronic label can be removable from the physical object and affixed to a different physical object. The electronic label can display different information (e.g., different machine-readable elements encoded with an identifier of the different object) when affixed to the different object.

FIG. 1 is a schematic diagram of exemplary physical objects 104 disposed on shelving units 102 with an electronic label according to an exemplary embodiment. The physical objects 104 can be disposed on shelving units 102 in a first location 100 of a facility. The shelving units 102 can include labels 116 disposed on the front faces of the shelves of the shelving units 102. The labels 116 can include first machine-readable elements 118. The first machine-readable element 118 can be encoded with identifiers associated with the physical objects 104 which the physical objects disposed on the shelves with respect to the labels 116.

Electronic labels 106 can be secured to the physical objects 104. The electronic labels 106 can include a RFID tag 108, an image capturing device 112 and a display 114. The display 114 of the electronic labels 106 can render information associated with the physical objects to which the electronic labels 106 are affixed. For example, the information rendered by the display 114 can include one or more alphanumeric strings, graphics, icons, indicators, and/or second machine-readable elements 110. The second machine-readable element 110 can be encoded with an identifier associated with the physical object to which the electronic labels 106 are secured. The RFID tag 108 of the electronic labels 106 can be encoded with an identifier associated with the electronic labels 106. In some embodiments, the electronic labels 106 include electronic ink (e-ink) technology. The display 114 can be a paper-like display configured to reflect light. Alternatively, the displays 114 of the electronic labels 106 can be light emitting diodes (LED) and/or liquid crystal (LCD) displays.

The electronic labels 106 can program themselves to encode and generate the second machine-readable elements 110 and display the information associated with the physical objects to which they are affixed, e.g., the second machine-readable elements 110, on their respective display 114. The electronic labels 106 can receive instructions wirelessly (e.g., via radiofrequency communication). Alternatively, prior to securing the electronic labels 106 to the physical objects 104, the image capturing device 112 disposed on the electronic labels 106 can be configured to capture an image of the first machine-readable element 118 associated with the physical object 104, and can generate and display the second machine-readable element 110 encoded with the same identifier as encoded in the first machine-readable element 118, based on the captured image.

The electronic labels 106 can receive instructions to display graphic, icons, or indicators on their respective displays 114. For example, the electronic labels 106 can receive instructions to change the background color or other visual aspect of the display 114 (e.g., rendering graphics or icons). As a non-limiting example, the electronic labels 106 can change the pattern of the background from a one color to another color or to a pattern, as indicated by the arrow 120.

Figure 2A:
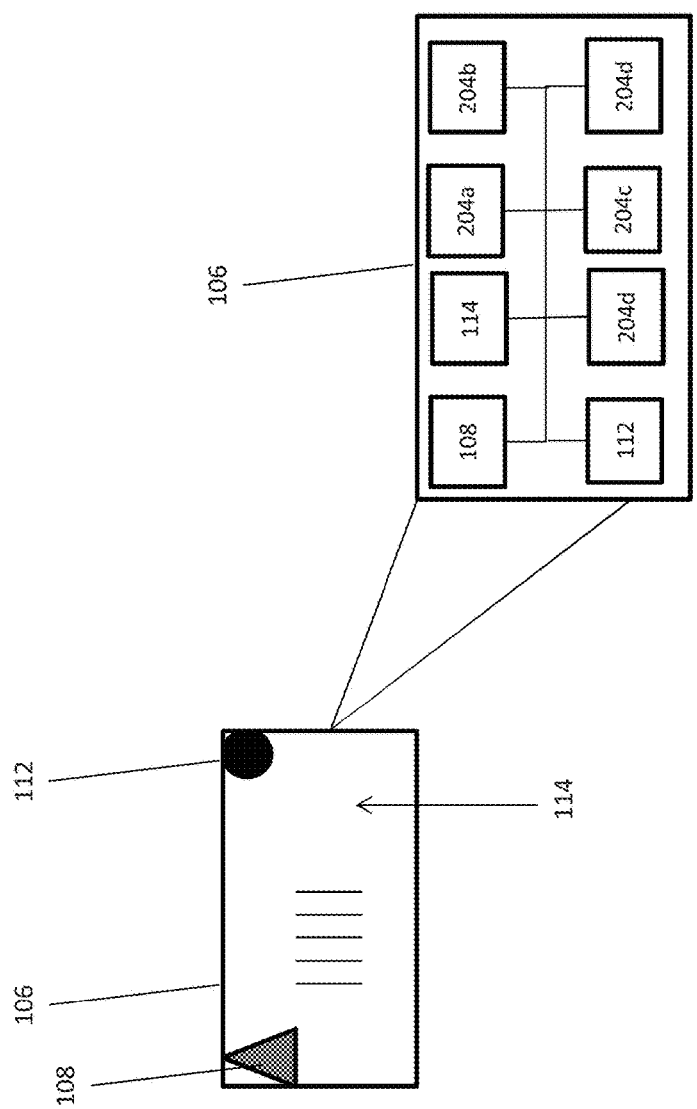
FIG. 2A illustrates an exemplary electronic label according to an exemplary embodiment.

FIG. 2A is a block diagram of an embodiment of the electronic labels 106 according to an exemplary embodiment. The electronic label 106 can include the RFID tag 108, the image capturing device 112, the display 114, a controller 204a, an energy storage device or power source 204b (e.g., a battery or capacitor), a transceiver 204c, and memory 204d. The display 114 can be configured to be controlled by the controller 204a to display information associated with a physical object to which the label 106 is affixed.

The power source 204b can provide power to the display 114, the RFID tag 108, the image capturing device 112, the controller 204a, the transceiver 204c, and the memory 204d. The transceiver 204c can include a transmitter and a receiver and can be configured to communicate with the computing system. Based on signals received from the computing system, via the transceiver 204c, the controller 204a can control the display to change the information rendered on the display 114.

Figure 2B:
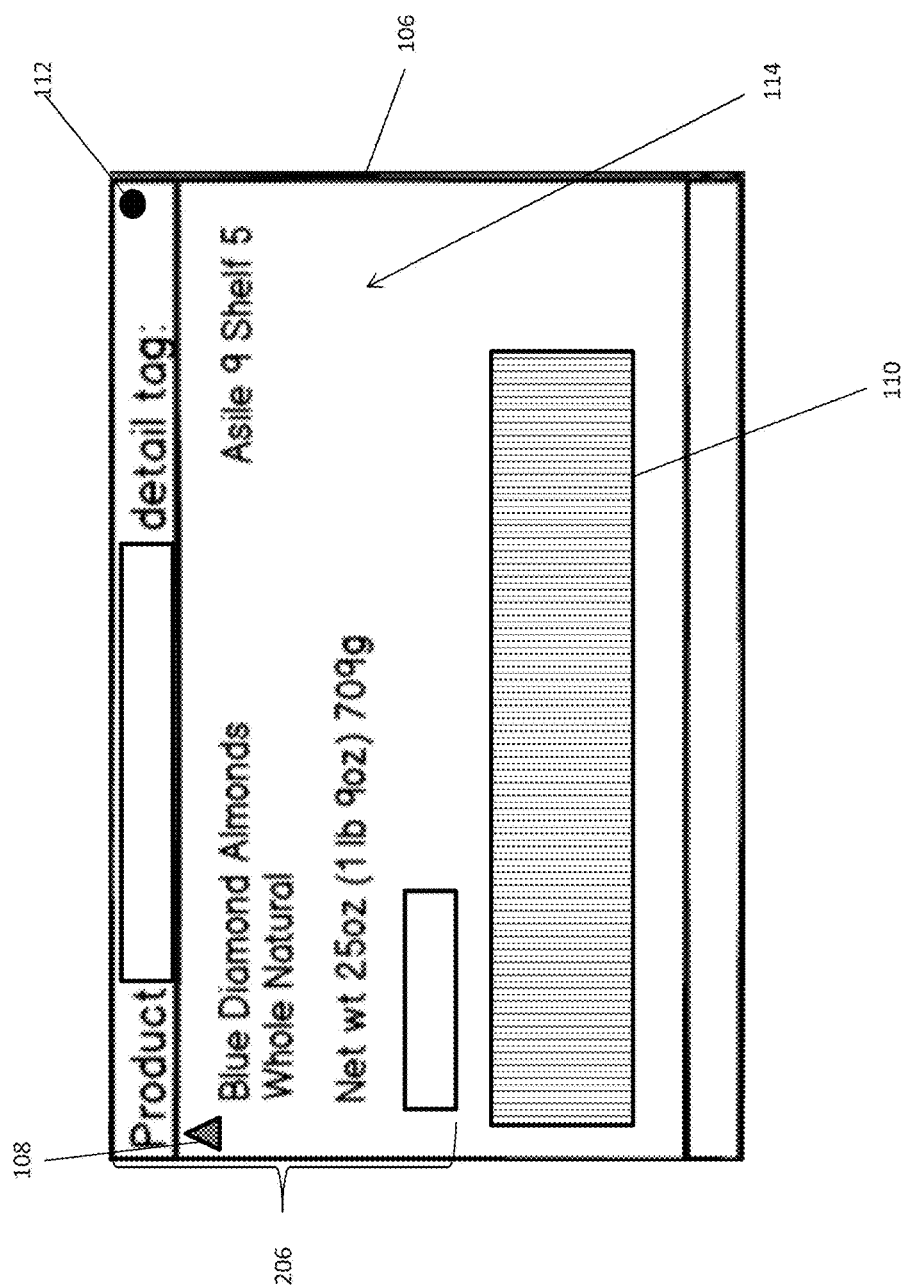
FIG. 2B is an exemplary embodiment of the display electronic label according to the present disclosure.

FIG. 2B is an exemplary embodiment of the display electronic label 106 according to the present disclosure. As indicated above, the electronic label 106 can include the RFID tag 108, the image capturing device 112 and the display 114. The display 114 can be configured to display information 206 associated with the physical object on which the electronic label 106 is affixed. The display 114 can also be configured to display a machine-readable element 110 encoded with an identifier associated with the physical object. The information 206 can include the name of the physical object; weight; size; dimensions; location within the facility; graphics, icons, or indicators regarding a status of the physical object; and a date and timestamp of when more like physical objects will be deposited at the location within the facility.

Figure 2C:
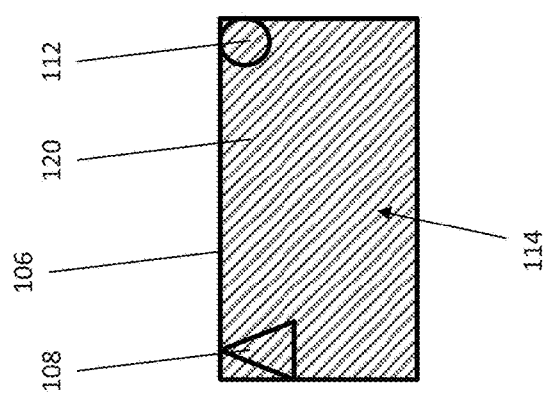
FIG. 2C is an exemplary embodiment of the display electronic label according to the present disclosure.

FIG. 2C is an exemplary embodiment of the display electronic label 106 according to the present disclosure. As mentioned above, the electronic label 106 can include a RFID tag 108, an image capturing device 112 and a display 114. In some embodiments, the electronic label 106 may only display a graphic, icon, or visual indicator 120 on the display 114 without any further information associated with the physical object on which the electronic label 106 is displayed. The visual indicator 120 can correspond to a status of the physical object.

FIG. 3 illustrates an electronic terminal disposed in a facility according to an exemplary embodiment. An electronic terminal 302 can be disposed in a second location 300 of a facility. The electronic terminal 302 can include an optical scanner 304. The optical scanner 302 can be configured to scan and decode an identifier from a machine-readable element. The machine-readable element can be a barcode and/or a QR code. A RFID reader 306 can be configured to read RFID tags that are within the range of the RFID reader 306 and the RFID reader 306 can decode identifiers encoded in the RFID tags. The RFID reader 306 can be disposed with respect to the electronic terminal 302.

As an example, the physical object having the electronic label affixed to it can be transported to the electronic terminal 302, and the RFID reader 306 can read the RFID tag 108 disposed on electronic label 106 in response to the RFID tag 108 being within a range of the RFID reader 306. The RFID reader 306 can decode an identifier encoded in the RFID tag 108. The RFID reader 306 can transmit the identifier to a remote computing system, an example of which is described in further detail with respect to FIG. 4.

The optical scanner 304 can attempt to scan the second machine-readable element 110 displayed on the display 114 of the electronic label. The display 114 can display a visual indicator 120, such as a color, graphic, or pattern that indicates that the physical object 104 is reserved and unavailable. In some embodiments, the electronic terminal 302 can receive instructions from the remote computing system to electronic terminal 302 from performing one or more actions. Alternatively, the remote computing system can control the electronic label 106 to scramble the second machine-readable element 110 so that the optical scanner 304 is unable to scan the second machine-readable element 110.

Figure 4:
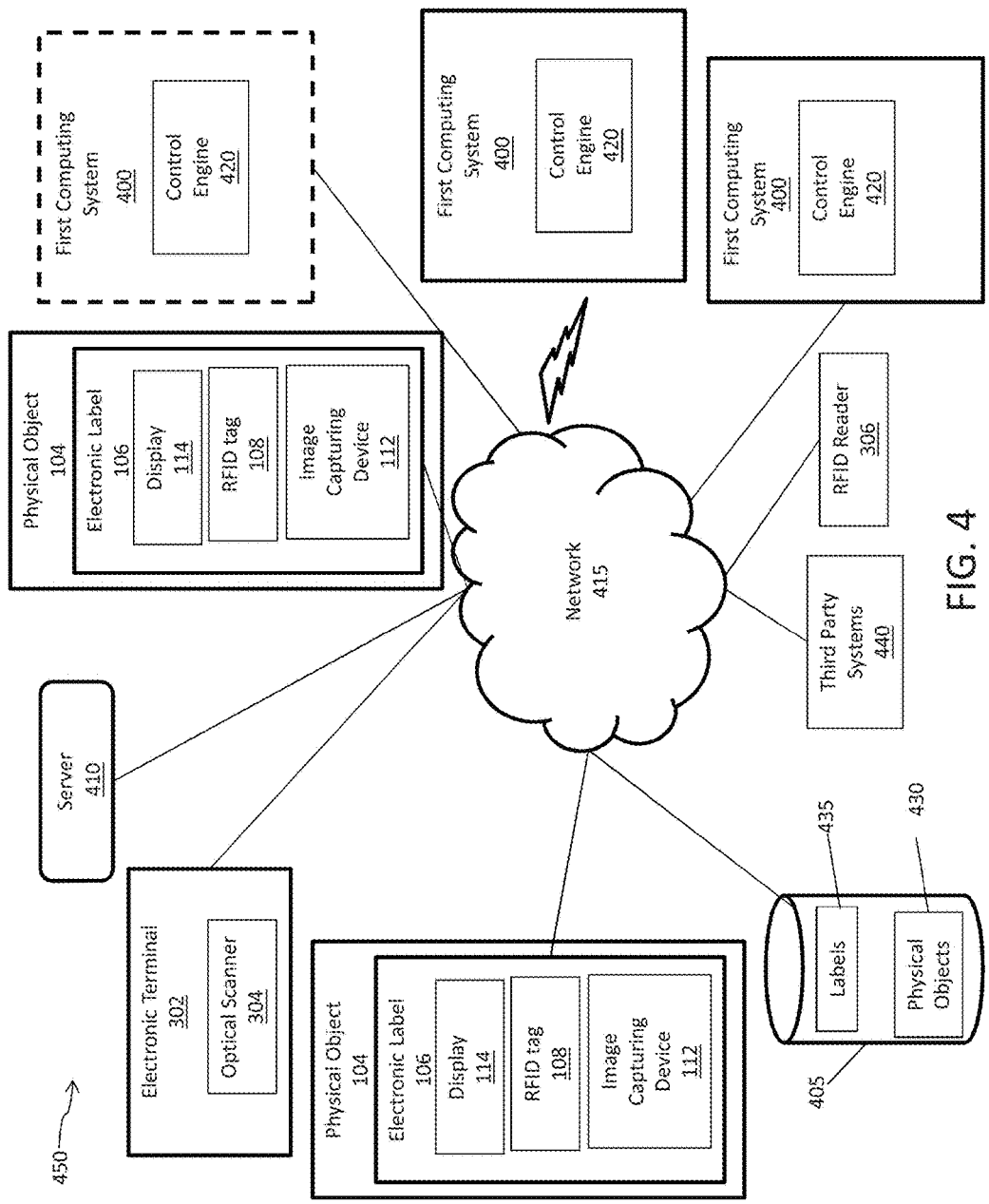
FIG. 4 illustrates an exemplary automatic physical object status marking system in accordance with an exemplary embodiment.

FIG. 4 illustrates an exemplary automatic physical object status marking system in accordance with an exemplary embodiment. The automatic physical object status marking system 450 can include one or more databases 405, one or more (first) computing systems 400, electronic labels 106 disposed on physical objects, one or more electronic terminals 302 (e.g., second computing systems), one or more third party computing systems 440, and RFID readers 306.

In exemplary embodiments, the first computing system 400 is in communication with one or more of the databases 405, the server 410, the electronic labels 106 disposed on products, the electronic terminals 302, the third party systems 440, and the RFID readers 306 via a communications network 415. The first computing system 400 can execute one or more instances of a control engine 420. The control engine 420 can be an executable application residing on the computing system 400. The control engine 420 can execute the process of the automatic physical object status marking system 450 as described herein.

In an example embodiment, one or more portions of the communications network 415 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The first computing system 400 includes one or more computers or processors configured to communicate with the databases 405, the electronic labels 106 disposed on physical objects 104, the electronic terminals 302, the third party systems 440, and the RFID readers 306, via the network 415. The first computing system 400 hosts one or more applications configured to interact with one or more components of the automatic physical object status marking system 450. The databases 405 may store information/data, as described herein. For example, the databases 405 can include a physical objects database 430 and a label database 435. The physical objects database 430 can store information associated with physical objects. The physical objects database 430 can store information associated with electronic labels, e.g., identifiers, object to which the electronic labels are affixed, a current status of indicators of the electronic labels, and the like. The databases 405 and server 410 can be located at one or more geographically distributed locations from each other or from the computing system 400. Alternatively, the databases 405 can be included within server 410 or computing system 400.

In one embodiment, the first computing system 400 can receive instructions from one or more third party systems 440, to reserve physical objects 104 disposed in a facility. The instructions can include identifiers associated with the physical objects 104 to be reserved. In some embodiments, the instructions can include an identifier associated with a specific facility. Alternatively, the first computing system 400 can determine the specific facility based on the location of the disparate source 440 from which the instructions were received. The first computing system 400 can execute the control engine 420 in response to receiving the instructions. The control engine 420 can query the physical objects database 430 to determine a quantity of each of the physical objects 104 disposed in the facility that are available to be reserved. The control engine 420 can query the label database 435 to identify the electronic labels 106 disposed on the physical objects 104 based on the identifier encoded in the RFID tag 108. The control engine 420 can control the display 114 of the identified electronic labels 106 corresponding to the physical objects 104 to be reserved to display a visual indicator. The visual indicator can be a change of color, background, graphic, text, image and/or other visual cues displayed on the display 114. In some embodiments, the electronic label 106 may not display the machine-readable element on the display 114. The electronic label 106 may display the visual indicator on the display 114.

The control engine 420 can store the identifier (encoded in the RFID tag 108) associated with electronic labels 106, which display the visual indicator that indicates the corresponding physical objects have been reserved. In some embodiments, a reserved physical object 104 can be carried/transported to the electronic terminals 302. The electronic terminal 302 can attempt to scan a machine-readable element associated with the reserved physical object 104, using the optical scanner 304. A RFID reader 306 can be disposed with respect to the electronic terminal 302. In response to a reserved physical object 104 with an electronic label 106 displaying a visual indicator being in range of the RFID reader 306, the RFID reader 306 can detect the RFID tag 108 disposed on the electronic label 106. The RFID reader 306 can decode the identifier associated with the electronic label 106 from the RFID tag 108, and can transmit the decoded identifier to the electronic terminal 302.

The electronic terminal 302 can query the label database 435 using the identifier received from the RFID reader 306. The electronic terminal 302 can determine the electronic label 106 is affixed on a reserved physical object 104, based on the query. The electronic terminal 302 can correlate the identifier of the RFID tag 108 and the identifier associated with the physical object. The electronic terminal 302 can determine that physical object 104 is reserved and is not to be processed when scanned such that in response to scanning a machine-readable identifier associated with the physical object, the electronic terminal generates an error message or other notification that the physical object has been reserved. In some embodiments, the electronic label 106 that is read by the RFID reader and correlated with a scanned machine-readable element can be controlled, e.g., via the (first) computing system 400 to flash, change colors, and/or otherwise modify what is being displayed. In some embodiments, the electronic terminal can query the physical objects database 430 to determine whether a physical object like the reserved physical object is available at a different location of the facility. The electronic terminal can transmit an alert in response determining, the physical object like the reserved physical object, is available at a different location of the facility.

Alternatively or in addition to, the electronic terminal 302 can prevent the optical scanner 304 from scanning and/or decoding the machine-readable element displayed on the display of the electronic label 106 disposed on the reserved object, or anywhere else on the reserved object. In some embodiments, the RFID reader 306 can also transmit identifier of the electronic label 106 to the first computing system 400. The control engine 420 can control the display 114 to generate a light effect. For example, control engine 420 can control the display to flash a specified color.

In some embodiments, the electronic label 106 can be removable from the physical objects 104. An electronic label 106 can be removed from a first physical object 104 and placed on a second physical object 104. The control engine 420 can wirelessly program the electronic label 106 to stop displaying a machine-readable element encoded with an identifier associated the first physical object and display a machine-readable element encoded with an identifier associated with the second physical object.

In some embodiments, prior to placing the electronic label 106 on the second physical object, the image capturing device 112 disposed on the electronic label 106 can capture an image including attributes associated with the second physical object. The attributes can be a shelf-label including a machine-readable element encoded with an identifier of the second physical object, a name of the second physical object, and/or the shape, size or dimensions of the second physical object. The electronic label 106 can transmit the attributes to the first computing system 400. The control engine 420 can determine the identifier associated with the physical object 104 based on the attributes. The control engine 420 can control the electronic label 106 to display a machine-readable element encoded with an identifier associated with the second physical object 104.

As a non-limiting example, the automatic physical object status marking system 450 can be implemented in a retail store. The products can be embodied as products for sale disposed on shelving units in the retail store. The electronic labels 106 can be affixed to the products, displaying a machine-readable element encoded with an identifier associated with the product. The first computing system 400 can receive instructions from one or more third party systems 440, to reserve a specified amount of like products disposed in retail store. The third party systems can be customers purchasing the like products using the online store. The instructions can include an identifier associated with the like products. In some embodiments, the instructions can include a specified retail store. Alternatively, the first computing system 400 can determine a retail store based on the location of the disparate source 440 and/or customer from which the instructions were received. The first computing system 400 can execute the control engine 420 in response to receiving the instructions. The control engine 420 can query the physical objects database 430 to determine the amount of like products disposed in the retail store. The control engine 420 can query the label database 435 to identify the electronic labels 106 disposed on the like products. The control engine 420 can control the display 114 of a specified amount of electronic labels 106, corresponding to the specified number of like products instructed to be reserved, to display a visual indicator. The visual indicator can indicate that the products are not on sale and can no longer be purchased. The visual indicator can be a change of color, background, image and/or other visual cues displayed on the display 114. In some embodiments, the control engine 420 can instruct the electronic label 106 to display a visual indicator. In some embodiments, the electronic label 106 may not display the machine-readable element on the display 114. The electronic label 106 may display the visual indicator on the display 114.

The control engine 420 can store the identifier (encoded in the RFID tag 108) associated with electronic labels 106, which display the visual indicator. A customer can carry/transport a reserved product to the electronic terminal 302. The electronic terminal 302 can be a Point-Of-Sale (POS) system. The POS system can attempt to scan the machine-readable element displayed on the display 114 of the electronic label 106 disposed on the reserved physical object 104, using the optical scanner 304. A RFID reader 306 can be disposed with respect to the second computing system 302. In response to, a reserved physical object 104 with an electronic label 106 displaying a visual indicator, being in range of the RFID reader 306, the RFID reader 306 can detect the RFID tag 108 disposed on the electronic label 106. The RFID reader 306 can decode the identifier associated with the electronic label 106 from the RFID tag 108. The RFID reader 306 can transmit the decoded identifier to the POS system.

The POS system can query label database 435 using the identifier received from the RFID reader 306. The POS system can determine the electronic label 106 is affixed on a reserved physical object 104, based on the query. The POS system can query the label database 435 using the identifier received from the RFID reader 306. The POS system can correlate the identifier of the RFID tag 108 and the identifier associated with the physical object. The POS system can determine that physical object 104 is reserved and is not to be scanned.

Alternatively or in addition to, the POS system can prevent the optical scanner 304 from scanning and/or decoding the machine-readable element displayed on the display of the electronic label 106 disposed on the reserved object, or anywhere else on the reserved object. Accordingly, the customer can be prevented from purchasing the reserved product. In some embodiments, the RFID reader 306 can also transmit identifier of the electronic label 106 to the first computing system 400. The control engine 420 can control the display 114 to generate a light effect. For example, control engine 420 can control the display to flash a specified color.

In some embodiments, the electronic label 106 can be removable from the products. An electronic label 106 can be removed from a first product and placed on a second product. The control engine 420 can wirelessly program the electronic label 106 to stop displaying a machine-readable element encoded with an identifier associated the first product and display a machine-readable element encoded with an identifier associated with the second product.

In some embodiments, prior to placing the electronic label 106 on the second product, the image capturing device 112 disposed on the electronic label 106 can capture an image including attributes associated with the second product. The attributes can be a shelf-label including a machine-readable element encoded with an identifier of the second product, a name of the second product, and/or the shape, size or dimensions of the second product. The electronic label 106 can transmit the attributes to the first computing system 400. The control engine 420 can determine the identifier associated with the product based on the attributes. The control engine 420 can control the electronic label 106 to display a machine-readable element encoded with an identifier associated with the second product.

Figure 5:
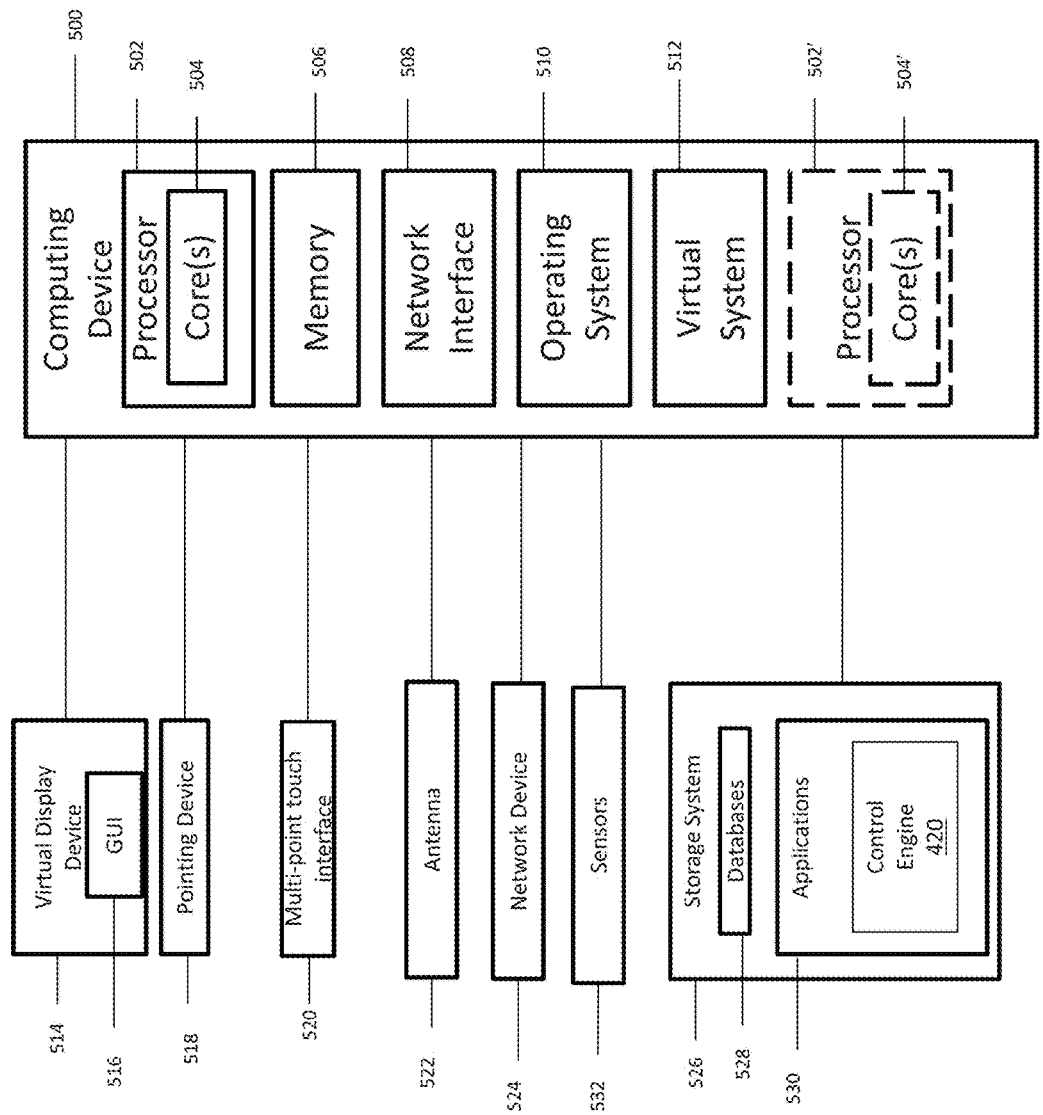
FIG. 5 illustrates an exemplary computing device in accordance with an exemplary embodiment.

FIG. 5 is a block diagram of an exemplary computing device suitable for implementing embodiments of the automatic physical object status marking system 450. The computing device 500 can be embodied as the first computing system, second computing system, and/or the third party systems. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the computing device 500 may store computer-readable and computer-executable instructions or software (e.g., applications 530 such as the control engine 420) for implementing exemplary operations of the computing device 500. The computing device 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments of the present disclosure. Processor 502 and processor(s) 502' may each be a single core processor or multiple core (504 and 504') processor. Either or both of processor 502 and processor(s) 502' may be configured to execute one or more of the instructions described in connection with computing device 500.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof. The computing device 500 can receive data from input/output devices such as, an optical scanner 532.

A user may interact with the computing device 500 through a visual display device 514, such as a computer monitor, which may display one or more graphical user interfaces 516, multi touch interface 520 and a pointing device 518.

The computing device 500 may also include one or more storage devices 326, such as a hard-drive, CD-ROM, or other computer readable media, for storing data and computer-readable instructions and/or software that implement exemplary embodiments of the present disclosure (e.g., applications such as the control engine 420). For example, exemplary storage device 426 can include one or more databases 528 for storing information regarding the physical objects and labels. The databases 528 may be updated manually or automatically at any suitable time to add, delete, and/or update one or more data items in the databases.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between the computing device 500 and a network and/or between the computing device 500 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 500 and performing the operations described herein. In exemplary embodiments, the operating system 510 may be run in native mode or emulated mode. In an exemplary embodiment, the operating system 510 may be run on one or more cloud machine instances.

Figure 6:
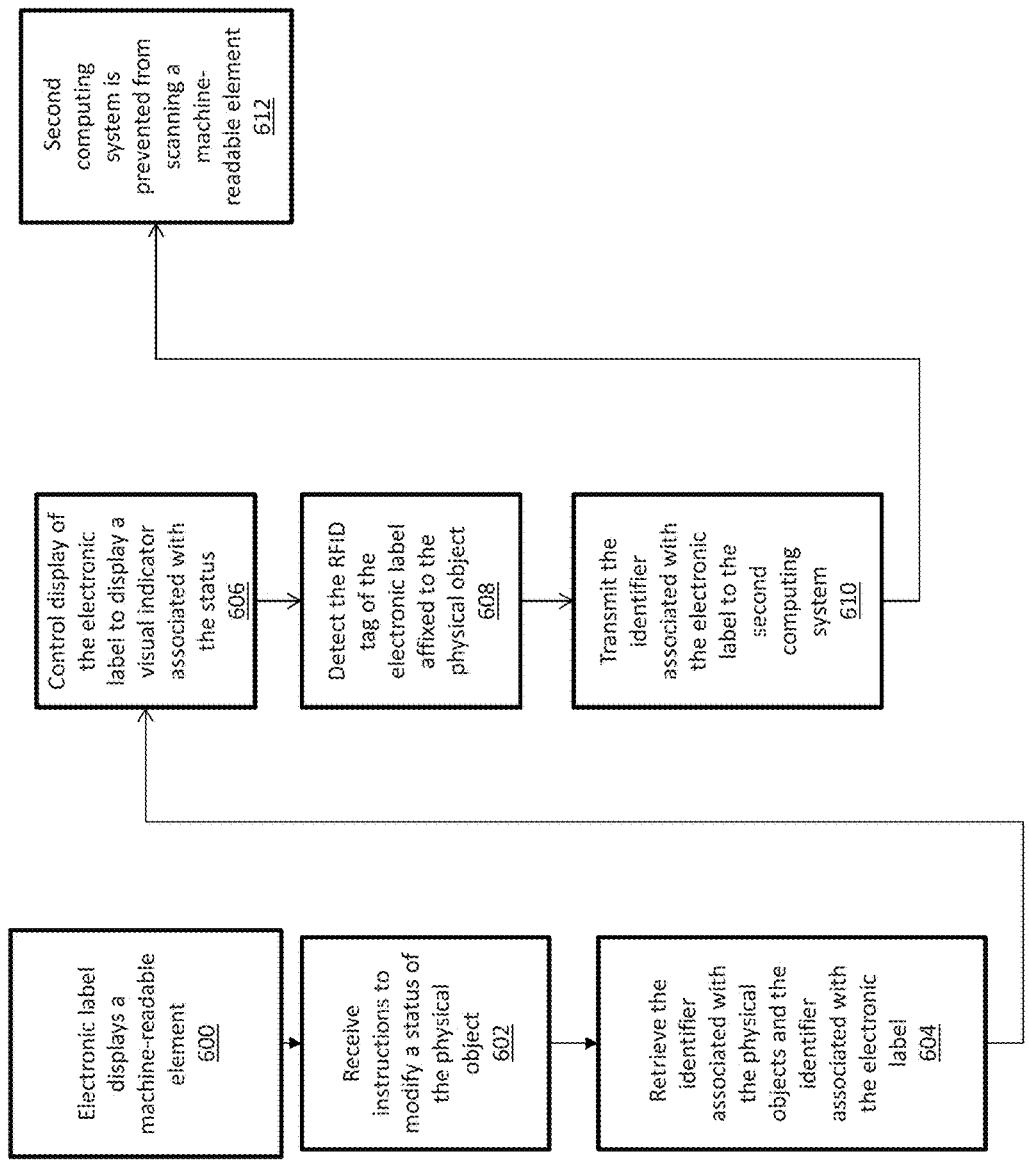
FIG. 6 is a flowchart illustrating a process of the automatic physical object status marking system according to an exemplary embodiment.

FIG. 6 is a flowchart illustrating an exemplary process performed by the automatic physical object status marking system according to an exemplary embodiment. In operation 600, an electronic label (e.g. electronic label 106 as shown in FIGS. 1-4) can display information, such as graphics, icons, visual indicators, a machine-readable element (e.g. machine-readable element 110 as shown in FIGS. 1-3) encoded with a identifier associated with a physical object (e.g. physical object 104 as shown in FIGS. 1-4) on the display (e.g. display 114 as shown in FIGS. 1-4). In some embodiments, the display may not display the machine-readable element. Each electronic label is affixed to a corresponding physical objects disposed in a first location (e.g. first location 100 as shown in FIG. 1) of a facility. The electronic label includes the display, a RFID tag (e.g. RFID tag 108 as shown in FIGS. 1-4) encoded with an identifier associated with the electronic label. The identifier encoded in the machine-readable element can be associated with the physical object on which the electronic label is affixed.

In operation 602, a first computing system (e.g. first computing system 400 as shown in FIG. 4) including a database (e.g. physical object database 430 and/or the label database 435 as shown in FIG. 4) and selective communication with the electronic label, can receive instructions to modify a status of the physical object. In operation 604, the first computing system can querying the physical objects and label database to retrieve the identifier associated with the physical objects and the identifier associated with the electronic label. In operation 606, the first computing system can control display of the electronic label to display a graphic, icon, or visual indicator (e.g. the visual indicator 120 as shown in FIG. 1) associated with the status of the physical object. In operation 608, an RFID reader (e.g. RFID reader 306 as shown in FIG. 3) can detect the RFID tag of the electronic label affixed to the physical object in response to the RFID tag being within range of the RFID reader. The RFID reader can be disposed with respect to a second computing system (e.g. electronic terminal 302 as shown in FIGS. 3-4). The second computing system can include an optical scanner (e.g. optical scanner 306 as shown in FIGS. 3-4). In operation 610, the RFID reader can transmit the identifier associated with the electronic label to the second computing system. In operation 612, the second computing system can attempt to scan a machine-readable element associated with the physical object. In some embodiments, in response to attempting to scan the machine-readable element, an error message can be displayed via the second computing system and/or the electronic label can be controlled to output one or more visual signals via the display of the electronic label (e.g., flash/blink, change colors, display a message) in response to the first identifier from the RFID reader and the machine-readable element corresponding to the physical object to which the electronic label is affixed. In some embodiments, when the display of the electronic label renders the machine-readable element, the electronic label can be controlled to scramble or otherwise modify the displayed machine-readable element to prevent the scanner from scanning the machine-readable element.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

One or more of the exemplary embodiments, include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI is a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An automatic physical object status marking system using electronic labels, the system comprising:
   a plurality of electronic labels, each electronic label configured to be affixed to a corresponding one of a plurality of physical objects disposed in a first location of a facility, at least one electronic label including a display, a RFID tag encoded with a first identifier, and an image capturing device affixed to the at least one electronic label, the at least one electronic label configured to:
      capture, via the image capturing device, an image of one or more attributes associated with a first one of the physical object;
      transmit the one or more attributes to a first computing system; and
      display a machine-readable element encoded with a second identifier on the display based on the image, the first identifier is associated with the at least one electronic label and the second identifier is associated with a first one of the physical objects on which the at least one electronic label is affixed;
   the first computing system including a database and being in selective communication with the at least one electronic label, the first computing system configured to:
      receive instructions to modify a status associated with the at least one physical object;
      query the database to retrieve the second identifier associated with the first one of the physical objects and the first identifier associated with the at least one electronic label; and
      control the display of the at least one electronic label to display a first indicator associated with the status;
   at least one RFID reader disposed with respect to a second computing system, the second computing system configured to:
      detect the RFID tag of the at least one electronic label affixed to the first one of the physical objects in response to the RFID tag being within range of the RFID reader; and
      transmit the first identifier encoded in the RFID tag to the second computing system, and
   wherein the second computing system is disposed at a second location in the facility and is operatively coupled to an optical scanner, the first computing system, and the at least one RFID reader, and
   wherein the second computing system is prevented from scanning the machine-readable element associated with the physical object in response to receiving the first identifier from the RFID reader.

2. The system of claim 1, wherein the first computing system is configured to:
   determine the second identifier is associated with the first one of the physical objects;
   generate the machine-readable element encoded with the second identifier; and
   control the display of the at least one electronic label to display the machine-readable element.

3. The system of claim 1, wherein the first computing system is further configured to:
   detect that the second computing system is prevented from scanning the machine-readable element; and
   control the display of the at least one electronic label to display a second indicator.

4. The system of claim 3, wherein the first and second indicators are different colors.

5. The system of claim 1, wherein the first computing system receives instructions to modify the status associated with the first one of the physical objects from one or more third party systems.

6. The system of claim 1, wherein the display of the at least one electronic label is an e-ink display.

7. The system of claim 1, wherein the display is a light emitting diode (LED) display or a liquid crystal display (LCD).

8. The system of claim 1, wherein the at least one electronic label affixed the first one of the physical objects, is removable.

9. The system of claim 8, wherein the at least one electronic label is removed from the first one of the physical objects and affixed to different one of the physical objects, and in response to being removed from the first one of the physical objects and affixed to the different one of the physical objects, the at least one electronic label is configured to:
   render, on the display a machine-readable element encoded with a third identifier associated with the different one of the physical objects.

10. An automatic physical object status marking method using electronic labels, the method comprising:
    capturing, via an image capturing device affixed to at least one electronic label of a plurality of electronic labels, an image of one or more attributes associated with a first one of the physical object; each electronic label configured to be affixed to a corresponding one of a plurality of physical objects disposed in a first location of a facility, the at least one electronic label being affixed to the first one of the physical objects and including a display, and a RFID tag encoded with a first identifier;

transmitting the one or more attributes to a first computing system;

displaying a machine-readable element via a display of the at least one electronic label based on the image, the first identifier is associated with the at least one electronic label and the second identifier is associated with a first one of the physical objects on which the at least one electronic label is affixed;

receiving instructions to modify a status associated with the at least one physical object via the first computing system, the first computing system including a database and being in selective communication with the at least one electronic label;

querying, via the computing system, the database to retrieve the second identifier associated with the first one of the physical objects and the first identifier associated with the at least one electronic label;

controlling, via the computing system, the display of the at least one electronic label to display a first indicator associated with the status;

detecting, via at least one RFID reader disposed with respect to a second computing system, the RFID tag of the at least one electronic label affixed to the first one of the physical objects in response to the RFID tag being within range of the RFID reader; and transmitting, via the at least one RFID reader, the first identifier encoded in the RFID tag to the second computing system, wherein the second computing system is disposed at a second location of the facility and is operatively coupled to an optical scanner, the first computing system, and the at least one RFID reader, and wherein the second computing system is prevented from scanning the machine-readable element associated with the physical object in response to receiving the first identifier from the RFID reader.

11. The method of claim 10, further comprising:
determining, via the first computing system, the second identifier is associated with the first one of the physical objects;
generating, via the first computing system, the machine-readable element encoded with the second identifier; and
controlling, via the first computing system, the display of the at least one electronic label to display the machine-readable element.

12. The method of claim 10, further comprising:
detecting, via the first computing system, that the second computing system is prevented from scanning the machine-readable element; and
controlling, via the first computing system, the display of the at least one electronic label to display a second indicator.

13. The method of claim 12, wherein the first and second indicators are different colors.

14. The method of claim 10, further comprising receiving, via the first computing system, instructions to modify a status associated with the first one of the physical objects from one or more third party systems.

15. The method of claim 10, wherein the display of the at least one electronic label is an e-ink display.

16. The method of claim 10, wherein the display is a light emitting diode (LED) display or a liquid crystal display (LCD).

17. The method of claim 10, wherein the at least one electronic label affixed to the first one of the physical objects, is removable.

18. The method of claim 17, further comprising:
removing the at least one electronic label from the first one of the physical objects;
affixing the at least one electronic label, to different one of the physical objects; and
in response to being removed from the first one of the physical objects and affixed to the different one of the physical objects, displaying, via the display of the at least one electronic label, a machine-readable element encoded with a third identifier associated with the different one of the physical objects.

* * * * *